United States Patent [19]
Serizawa et al.

[11] Patent Number: 5,214,592
[45] Date of Patent: May 25, 1993

[54] MACHINE TOOL POSITION CORRECTING METHOD AND APPARATUS

[75] Inventors: Syogo Serizawa; Nobuhisa Ohtake; Masahiro Akiyama; Noboru Hayama; Nobuyuki Aiso, all of Numazu, Japan

[73] Assignee: Toshiba Kika Kabushiki Kaisha, Tokyo, Japan

[21] Appl. No.: 599,151

[22] Filed: Oct. 17, 1990

[30] Foreign Application Priority Data

Oct. 19, 1989 [JP] Japan ............................ 1-122623[U]

[51] Int. Cl.⁵ ...................... G06F 15/46; G05B 19/19
[52] U.S. Cl. ........................ 364/474.35; 364/474.02; 364/474.18; 409/80; 409/238
[58] Field of Search ...................... 364/474.17, 474.18, 364/474.35, 474.02, 167.01; 409/80, 238, 239; 408/3, 11, 16

[56] References Cited

U.S. PATENT DOCUMENTS

| | | | |
|---|---|---|---|
| 4,178,834 | 12/1979 | Holmstrom | 409/239 |
| 4,486,841 | 12/1984 | Koyama et al. | 364/474.35 X |
| 4,775,926 | 10/1988 | Hasegawa et al. | 364/167.01 |
| 5,053,973 | 10/1991 | Fujii et al. | 364/474.35 X |

FOREIGN PATENT DOCUMENTS

| | | |
|---|---|---|
| 57-114049 | 7/1982 | Japan . |
| 60-9635 | 1/1985 | Japan . |
| 62-99037 | 5/1987 | Japan . |

*Primary Examiner*—Joseph Ruggiero
*Attorney, Agent, or Firm*—Cushman, Darby & Cushman

[57] ABSTRACT

A machine tool position correcting method and apparatus applied to a machine tool including a spindle head provided on a column and a ram which is movable horizontally on the spindle head and has a main shaft to which a tool is mountable. In the arrangement, a quantity of horizontal movement of the ram is detected, a quantity of vertical correction of the ram is calculated on the basis of the detected quantity of horizontal movement of the ram, and the spindle head is moved vertically, while keeping a horizontal position thereof, on the basis of the calculated quantity of vertical correction of the ram. Since a vertical deviation of the ram has a correction to its quantity of horizontal movement, the vertical deviation, or quantity of vertical correction, of the ram is obtained by detecting its quantity of horizontal movement.

17 Claims, 8 Drawing Sheets

MACHINE TOOL POSITION CORRECTING METHOD AND APPARATUS

BACKGROUND OF THE INVENTION

1. Field of the Invention

The present invention relates to a method and apparatus for correcting the position of a horizontally movable member such as a ram and a quill of a machine tool and more particularly to a method and apparatus for correcting the position of a free end of a horizontally movable member deviating vertically from a reference position when the horizontally movable member is moved horizontally.

2. Description of the Related Art

Conventionally, there is known a machine tool in which a column has a vertically movable member such as a spindle head, and a ram (quill) as a horizontally movable member with a main shaft (spindle) on which a tool is mounted is movable horizontally on the vertically movable member. In this machine tool, there is the problem that if the ram is advanced or if a large-sized tool or attachment is mounted on the main shaft, the ram would be bent and thus its free end would hang down compared to a reference position due to the weight of the ram or tool itself, so that an error would be involved in machining.

In order to eliminate such a machining error due to the hanging-down of the free end of the ram, the position of the free end of the ram is conventionally corrected using a straightness correcting function provided optionally in a numerical control (NC) device.

However, there is the problem that this straightness correcting function can correct only for one shaft. For example, in an on-floor horizontal milling and boring machine in which the ram and the main shaft are both advanced, the straightness correcting function can only correct one of the ram and main shaft and cannot correct a possible deviation of the position of the other occurring when the other is extruded.

Therefore, as disclosed in each of Japanese Patent laid-open No. 57-114649, 60-9635 and 62-99037, a device is provided which corrects the tilt of the ram or spindle head with the pressure of a hydraulic oil and the balancing force of a balance weight concerned, namely, the centroid adjusting device. By using both of the centroid adjusting device and the straightness correcting function, both of the ram and the main shaft are said to be corrected with reference to position.

Since this centroid adjusting device corrects the tilts of the ram and spindle head, however, there is the problem that quantities of the correction to them are limited. Another problem is that various correcting devices are required to be provided additionally for adjusting the pressure of the hydraulic oil and the balancing force, so that cost would be high.

SUMMARY OF THE INVENTION

It is an object of the present invention to provide a machine tool position correcting apparatus which is capable of correcting the vertical position of a horizontally movable member such as a ram with a large quantity of the correction and with reduced cost.

According to the present invention, there is provided a method of correcting the position of a horizontally movable member such as a ram so as to be movable horizontally on a vertically movable member such as a spindle head, which is movable vertically on a column in a machine tool, the spindle head having a main shaft to which a tool can be attached. The method includes the steps of: detecting a quantity of horizontal movement of the ram; calculating a quantity of vertical correction to the ram from a parameter based on the correlation between the detected quantity of horizontal movement of the ram and a quantity of vertical deviation of the spindle head; and moving the spindle head vertically while keeping a horizontal position thereof by the calculated quantity of correction.

The parameter used in the calculating step may be such that a correction quantity curve for the ram is divided into a plurality of portions having different gradients which are arranged in an ascending order as the quantity of movement of the ram increases.

The calculating step may select one of a parameter used when an attachment is mounted to the ram and a parameter used when no attachment is mounted to the ram.

There may be a plurality of parameters, one for each kind of a attachment attached to the ram.

The calculating step may calculate a quantity of correction $\Delta Y$ to the ram, given by $$\Delta Y = (Y_1/Z_1) \times F \times T$$

where F is the speed of movement of the ram, T is the time required for calculating the quantity of the correction, and $(Y_1/Z_1)$ is the correction gradient of the ram for the parameter.

The detecting step may include detecting whether the ram is to be moved depending on the operation of a clutch which is disposed between the ram and a servo motor for driving the ram, and further includes detecting a quantity of horizontal movement of the ram from the rotational direction and quantity of the servo motor.

The moving step may include controlling a drive of a motor which moves the spindle head vertically.

According to the present invention, there is provided an apparatus for correcting the position of a horizontally movable member such as a ram which movable horizontally on a vertically movable member such as a spindle head, which is so as to be movable vertically on a column in a machine tool, the ram having a main shaft to which a tool can be attached. The apparatus includes: a detecting unit for detecting a quantity of horizontal movement of the ram; a calculating unit for calculating a quantity of vertical correction to the ram on the basis of the detected quantity of horizontal movement of the ram; and a control unit for moving the spindle head vertically while keeping a horizontal position thereof on the basis of the calculated quantity of correction.

The vertically movable member may include a spindle head while the horizontally movable member may include a ram or a quill.

The detecting unit may include a sensor for sensing the position of the ram, and a detector for detecting the quantity of movement of the ram from the position of the ram detected by the sensor.

The apparatus may include a storage unit for storing the horizontal position of the ram. The storage unit may store the position of the ram directly before its movement and updates the position of the ram after its movement with the position of the ram directly before its movement.

DETAILED DESCRIPTION OF THE PREFERRED EMBODIMENTS

Preferred embodiments of the present invention will be described hereinafter with reference to the drawings.

Figure 1:
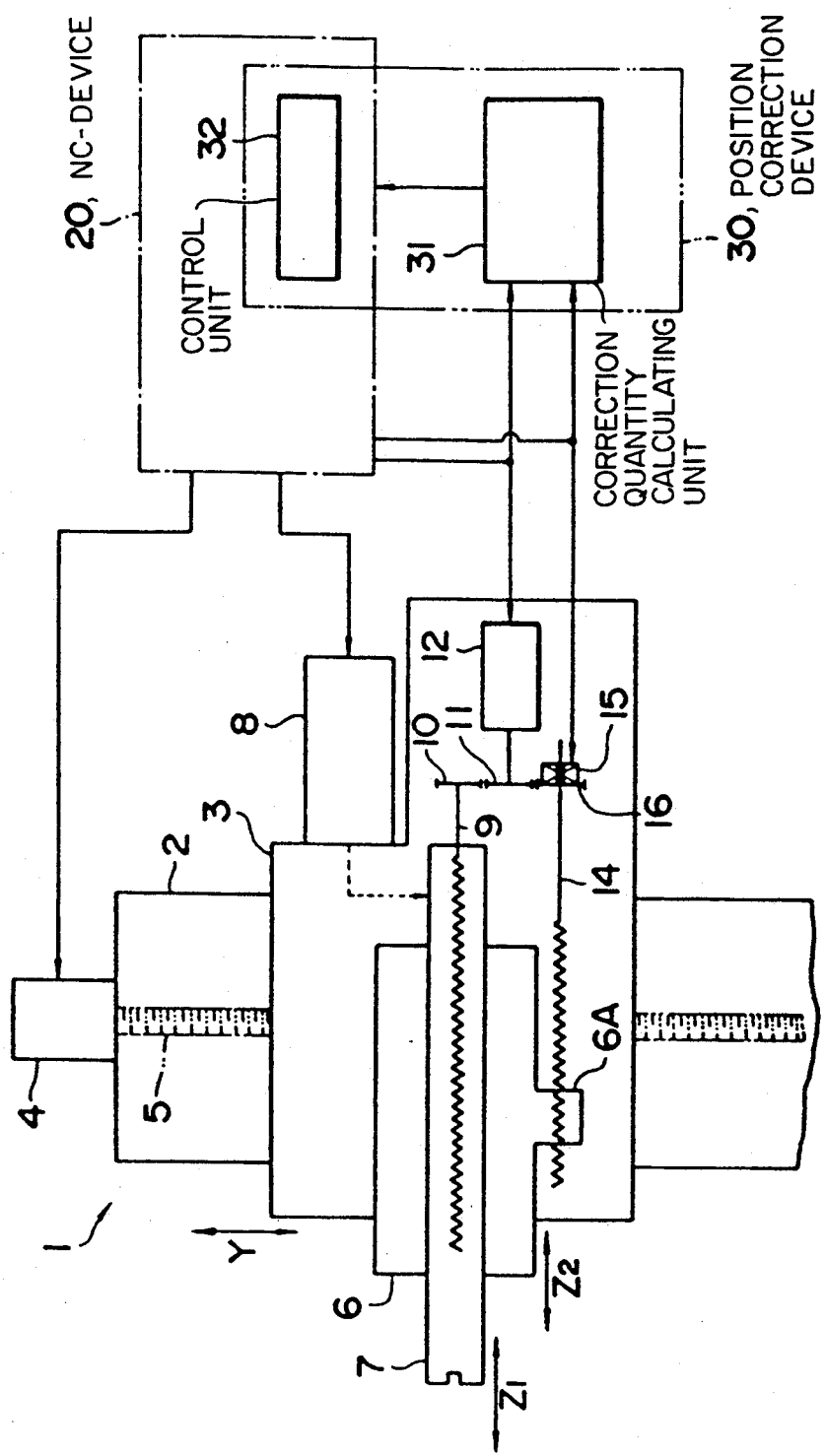
FIG. 1 is a schematic view of one embodiment of the present invention.

FIG. 1 illustrates the essential portion of an on-floor type horizontal milling and boring machine 1 to which the present invention is applied.

The boring machine 1 includes a column 2 disposed so as to be movable in the X-axis direction orthogonal to the sheet plane of FIG. 1. The column 2 has a spindle head 3 as a vertically movable member attached thereto so as to be movable vertically or in the Y-axis direction.

The spindle head 3 is moved vertically by a spindle head vertical-feed motor 4 provided on top of the column 2 and a spindle head vertical-feed screw 5 which is driven by the motor 4.

The spindle head 3 has a ram 6 as a horizontally movable member which is movable in the $Z_2$-axis direction orthogonal to the X- and Y-axes. The ram 6 includes a main shaft 7 which is movable in the horizontal $Z_1$-axis direction and which has a tool such as a drill or end mill (not shown) attached to a free end of the main shaft 7.

The main shaft 7 is rotated by a main motor 8 and has a $Z_1$-axis feed ball screw 9 threadedly engaged therein. The $Z_1$-axle is parallel to the $Z_2$-axle. The $Z_1$-axis feed ball screw 9 is connected through gears 10 and 11 to a servo motor 12. By transmitting the rotational drive force of the servo motor 12 to the $Z_1$-axis feed ball screw 9, the main shaft 7 is moved in the $Z_1$-axis direction.

Formed on the ram 6 is a connecting protrusion 6A in which a $Z_2$-axis feed ball screw 14 is threadedly engaged. The screw 14 is connected to the servo motor 12 through the clutch 15 and gears 16 and 11. Only when the clutch 15 is actuated, is the rotational drive force of the servo motor 12 transmitted to the $Z_2$-axis feed ball screw 14, thereby moving the ram 6 in the $Z_2$-axis direction.

The respective operations of the spindle head vertical-feed motor 4, main motor 8, servo motor 12 and clutch 15 are controlled by a numerical control (NC) device 20. If the spindle head 3 is to be moved in the Y-axis direction, the NC device 20 designates the rotational direction and quantity of the motor 4 and the motor 4 is driven accordingly. Similarly, if the main shaft 7 is to be moved in the $Z_1$-axis direction, the operation of the servo motor 12 is controlled by the NC device 20. If the ram 6 is to be moved in the $Z_2$-axis direction, the clutch 15 is actuated by the NC device 20. The respective ball screws 9, 14 and gears 10, 11 and 16 are set such that when the clutch 15 is actuated, the ram 6 and main shaft 7 move in the same direction and at the same speed so as to maintain their relative position.

Figure 2:
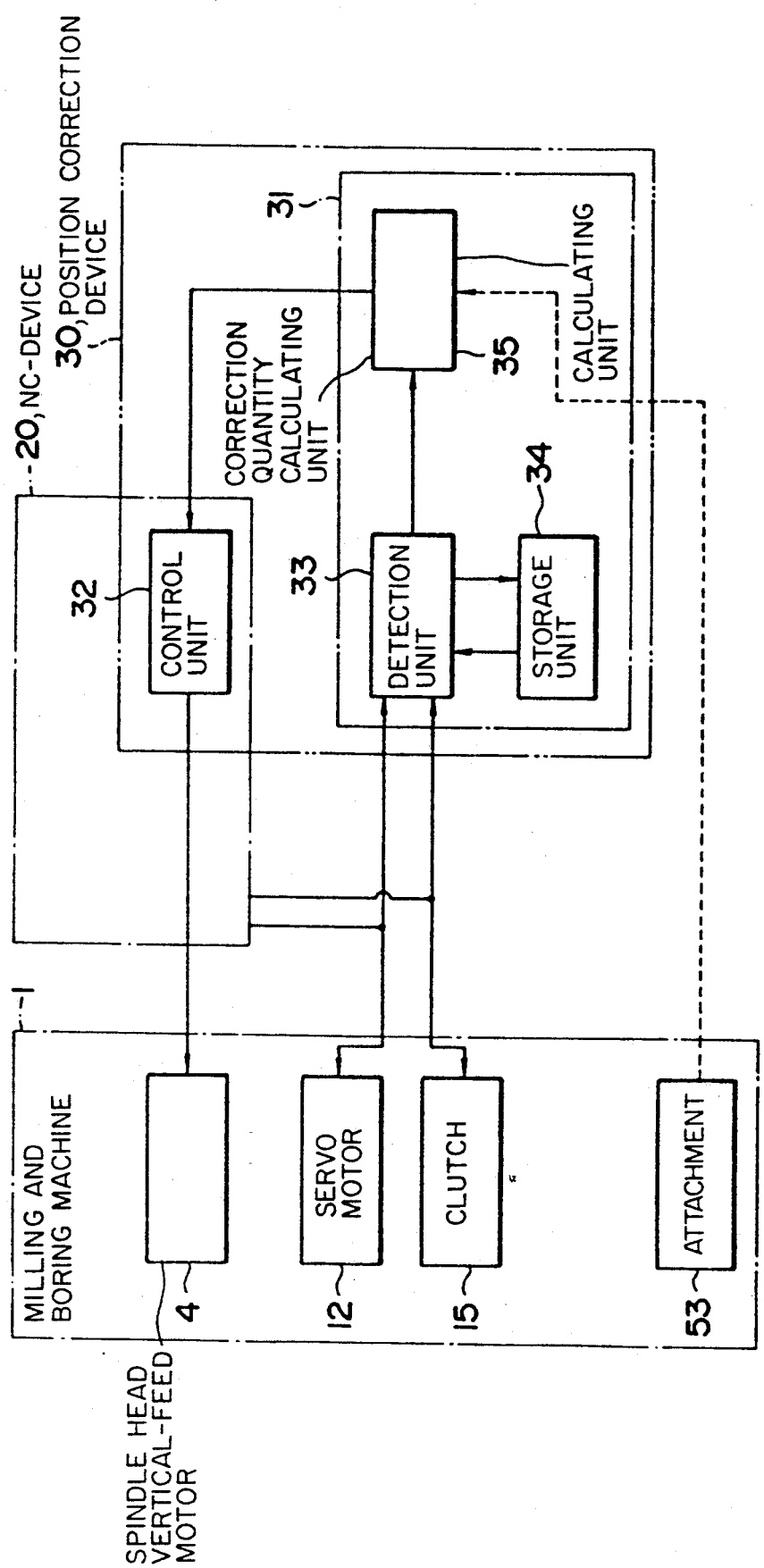
FIG. 2 is a block diagram indicative of the essential portion of the embodiment.

As shown also in FIG. 2, a position correction device 30 is provided to cause the NC device 20 to output signals to the servo motor 12 and clutch 15.

The position correction device 30 includes a correction quantity calculating unit 31 for calculating a quantity of correction to the ram 6 in the Y-axis direction and a control unit 32, included in the NC device 20, for controlling the spindle head vertical-feed motor 4.

The correction quantity calculating unit 31 includes a sensor 33 for sensing a quantity of movement of the ram 6 in the $Z_2$-axis direction, a storage unit 34 for storing the position of the ram 6 in the $Z_2$-direction or its $Z_2$-axis coordinates, and a calculating unit 35 for calculating a quantity of correction to the ram 6 in the Y-axis direction or a quantity of movement of the spindle head 3 from a quantity of movement of the ram 6 in the $Z_2$-axis direction on the basis of preset parameters.

Figure 3:
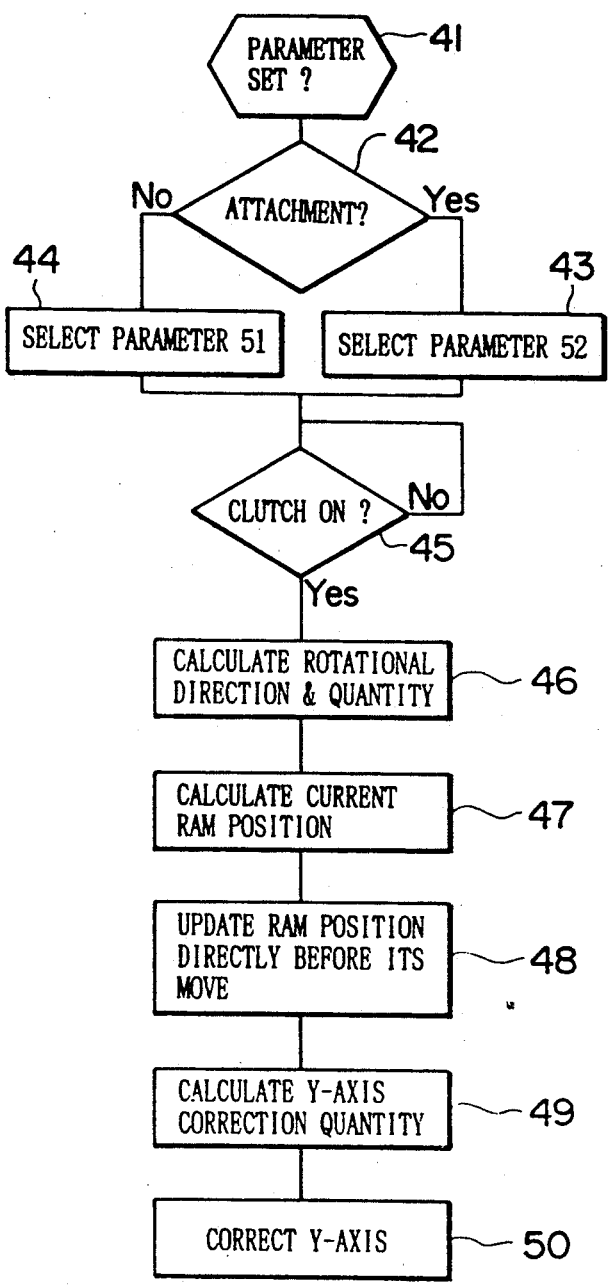
FIG. 3 is a flowchart indicative of a process for correction by the embodiment.

The correcting process of the present embodiment thus arranged will be described with reference to the flowchart of FIG. 3.

First, before the on-floor type horizontal milling and boring machine 1 is actuated, parameters used in the calculating unit 35 are set (step 41). The setting of these parameters is made in consideration of backlash, etc., by actually returning the ram 6 and main shaft 7 to the origin and then advancing them actually, making required measurements when the boring machine 1 is assembled or installed.

Figure 4:
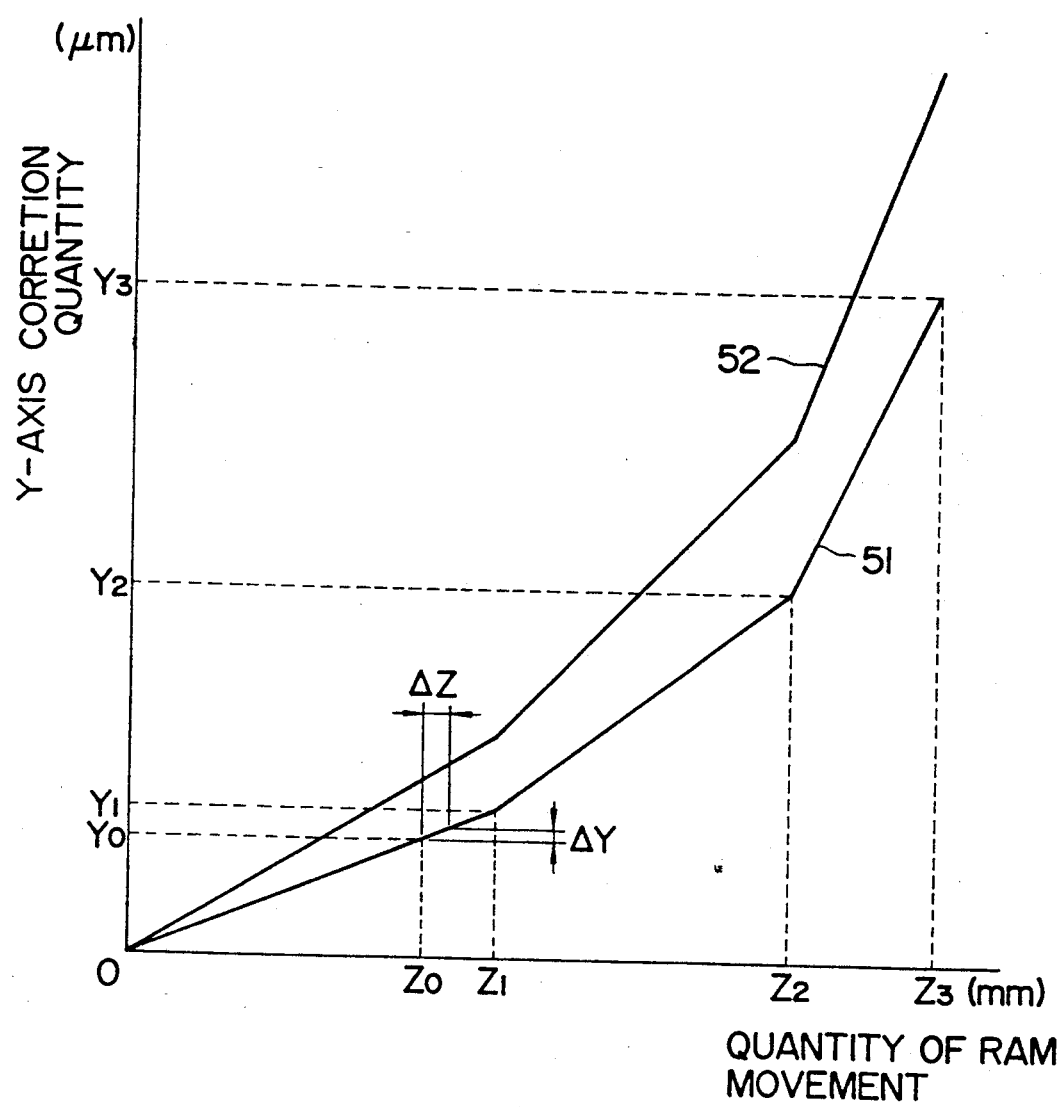
FIG. 4 illustrates the relationship between quantity of ram movement and quantity of Y-axis correction.

Generally, a quantity of movement of the ram 6 from the origin and a quantity of hanging-down of the ram 6 are not in given proportional relationship. As the quantity of movement of the ram 6 increases, the quantity of the hanging-down or deviation tends to increase rapidly. Therefore, as shown in FIG. 4, the parameters are such that a Y-axis correction curve is divided into three portions having different gradients which are arranged in an ascending order as the quantity of movement of the ram 6 increases respectively. A parameter 51 is for the ram 6 to which no attachment is attached while a parameter 52 is for the ram 6 to which an attachment 53 is mounted. There are a plurality of such parameters 52, each of which is determined depending on the kind of an attachment 53 used.

The calculating unit 35 determines in accordance with a predetermined code whether an attachment 53 is connected (step 42). If the attachment 53 is attached, the calculating unit 35 selects a parameter 52 corresponding to the attachment 53 (step 43). If no attachment 53 is attached, the calculating unit 35 selects the parameter 51 (step 44).

When the boring machine 1 is actuated, a detection unit 33 detects using a signal output from the NC device 20 to the clutch 15 whether the clutch 15 is actuated and hence the ram 6 is moved (step 45). If the clutch 15 is not actuated, the ram 6 is not moved, so that the position of the ram 6 is not corrected.

If the clutch 15 has been actuated, the detection unit 33 detects the rotational direction and quantity of the servo motor 12 in accordance with a signal from the NC device 20 to the servo motor 12 (step 46).

Figure 5A:
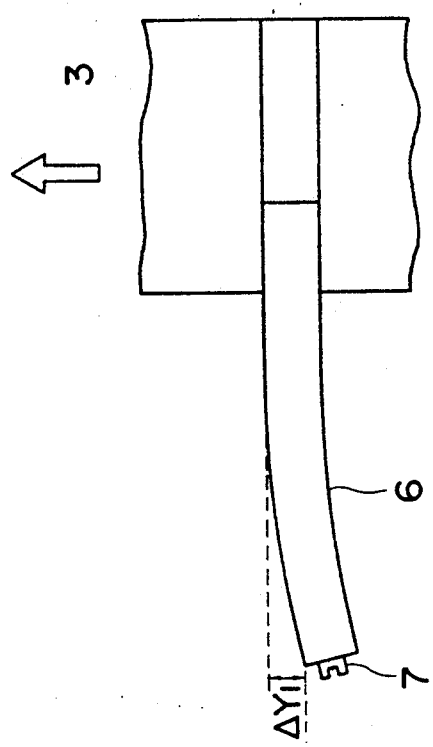
FIGS. 5(A) and 5(B) schematically illustrate a ram the position of which is not corrected and the ram the position of which is corrected, respectively.

The detection unit 33 reads the position of the ram 6 directly before its movement and stored in the storage unit 34. If the detection unit 33 determines from the detected rotational direction of the servo motor 12 that the ram 3 has advanced, it adds the position of the ram 6 directly before its movement to the quantity of movement of the ram 6 based on the rotational quantity of the servo motor 12 to calculate the position of the ram 6 after its movement in the $Z_2$-axis direction or the current position of the ram 6 ($Z_2$-axis coordinate). If the detection unit 33 determines that the ram 6 has retracted, it calculates the current position of the ram 6 by subtracting the quantity of movement of the ram 6 from the position of the ram 6 directly before its movement (step 47). At this time, the free end of the ram 6 is lowered by $\Delta Y_1$ compared to the horizontal position of the base portion of the ram 6, as shown in FIG. 5(A).

The detection unit 33 returns data on the current position of the ram 6 to the storage unit 34 to update therewith the data on the ram position directly before its movement (step 48) and delivers the data on the current position of the ram to the calculating unit 35 to calculate a quantity of Y-axis correction or a quantity of hanging down $\Delta Y_1$ of the ram 6 end from the parameters 51, 52 (step 49).

Figure 5B:
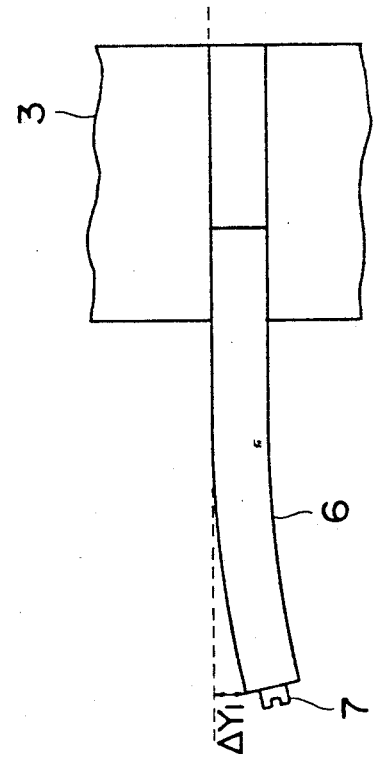

This Y-axis correction quantity is input to the control unit 32 using an external data inputting function of the NC device 20. The control unit 32 controls the drive of the spindle head vertical-feed motor 4 to move the spindle head 3 to thereby correct the free end of the ram 6 (step 50). Namely, as shown in FIG. 5(B), by moving the spindle head 3 upward by $\Delta Y_1$, the free end of the ram 6 is also moved upward by $\Delta Y_1$ to take the same horizontal position as the base portion of the ram 6 of FIG. 5(A).

The Y-axis correction quantity is obtained as an absolute value. Therefore, if the spindle head 3 is already moved from the origin, the difference between the quantity of movement of the spindle head 3 and the absolute Y-axis correction quantity is calculated and the spindle head 3 is moved by the difference.

According to the present embodiment, thus arranged, the following effects are produced.

Since a quantity of hanging down, or a Y-axis correction quantity, of the ram 6 caused by the horizontal movement of the ram 6 is calculated by the correction quantity calculating units 31 and the spindle head 3 is moved in the Y-axis direction in accordance with the Y-axis correction quantity to correct the position of the ram 6, the free end of the ram 6 is maintained invariably at a fixed level to thereby maintain the straightness of the ram 6 during machining. Therefore, by using the straightness correction mechanism of the NC device 20 exclusively for the main shaft 7, the straightness of both of the ram 6 and the main shaft 7 is corrected to thereby improve the machining accuracy.

Since this correction is made by moving the spindle head 3 while keeping a horizontal position thereof, a large quantity of the correction is obtained. Therefore, it is able to sufficiently cope with a possible increase in a quantity of correction of the ram 6 due to mounting any of various attachments 53.

Since the Y-axis correction quantity is calculated from the current position of the ram 6, accurate correction is achieved when the ram 6 is advanced as well as retracted.

Since the Y-axis correction quantity is detected from the output of the NC device 20, no special means for detecting the correction quantity is required. Correction is only required to be made by moving the movable spindle head 3 or by adding a correction quantity calculating unit 31 to the conventional system, so that cost is reduced.

The present invention is not limited to the structure of the above embodiment. Besides, changes and modifications of the embodiments which will fall within the scope of the present invention in which the object of the present invention is achieved are intended to be included in the present invention. While in the embodiment the Y-axis correction quantity is calculated, for example, by calculating the $Z_2$-axis coordinates of the ram 6, it may be calculated from a quantity of deviation of the ram 6 from its position directly before its movement. If a quantity of movement of the ram 6 is beforehand determined, a quantity of correction to the ram 6 may be calculated from the quantity of movement of the ram 6 directly before its movement and the ram 6 may be moved vertically by the quantity of correction after its movement.

While in the above embodiment the Y-axis correction quantity is calculated by calculating the $Z_2$-axis coordinates of the ram 6, correction can be delayed by a very short time depending on the calculating speed while the ram 6 is moving. Therefore, the Y-axis correction quantity may be calculated on a sequential basis.

For example, in the parameter 51 of FIG. 4, $Z_1 = 200$ mm and $Y_1 = 20$ μm and $(Y_1/Z_1)$ is the gradient of a quantity of correction of the ram 6 to the quantity of movement of the ram 6. Assume that the ram 6 is moved by $Z_0 = 153$ mm from the origin and already corrected by $Y_0 = 15.3$ μm in the Y-axis direction. Further, assume that the ram 6 is advanced at a speed F=300 mm/minute and the calculation time T for the correction quantity is 0.1 seconds. Then the quantity of the movement $\Delta Z$ of the ram 6 per calculation time is given by $$\Delta Z = F \times T = 0.5 \text{ mm}$$

The Y-axis correction quantity $\Delta Y$ to the ram 6 when it moves by $\Delta Z$ is given by $$\Delta Y = (Y_1/Z_1) \times \Delta Z = 0.05 \text{ um}$$

Therefore, by driving the spindle head 3 by the Y-axis correction quantity $\Delta Y$ or by adding $\Delta Y$ to the calculated Y-axis correction quantity, correction is achieved at all times which adjusts to the moving ram 6.

Figure 6:
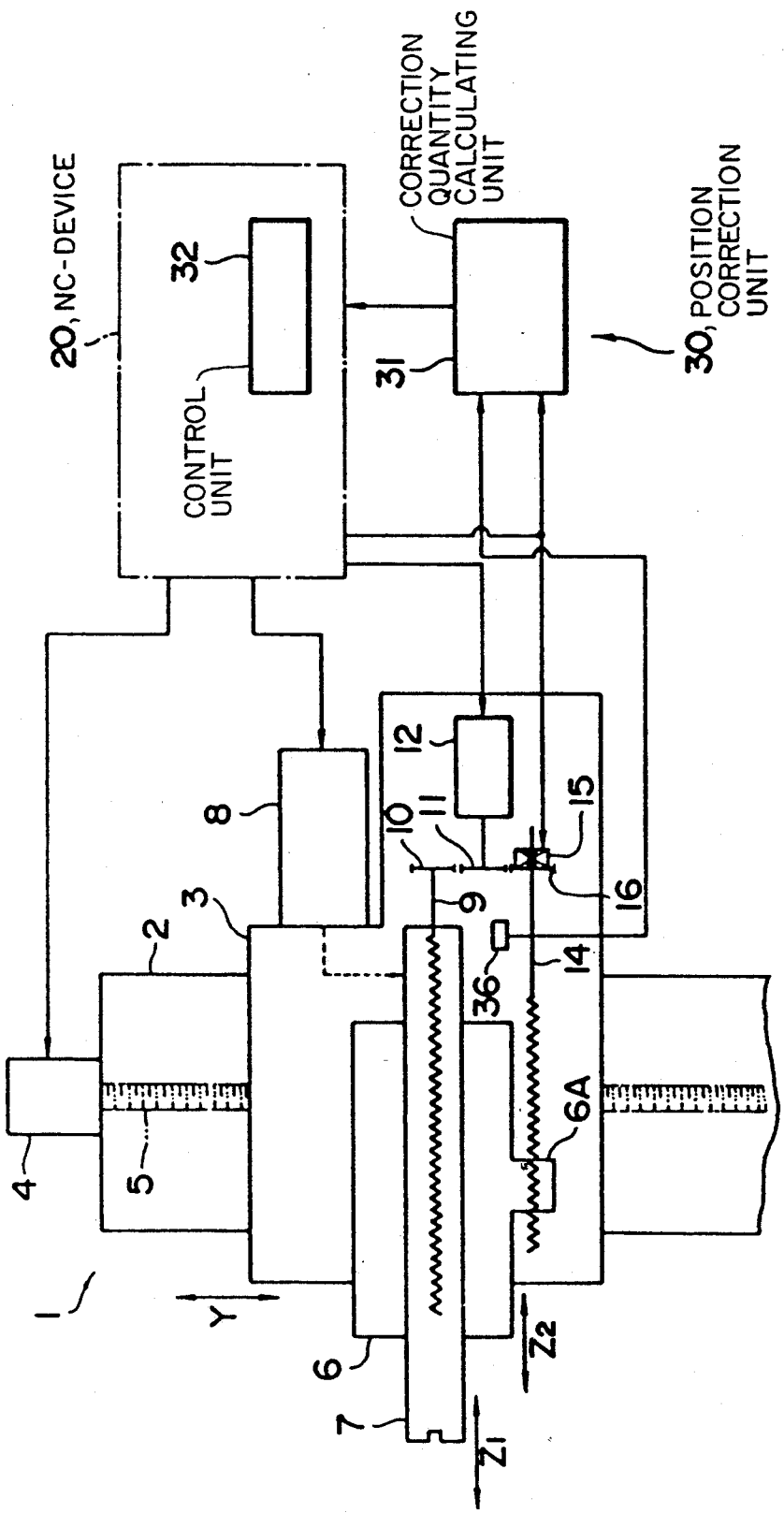
FIG. 6 is a schematic view of a further embodiment of the present invention.
Figure 7:
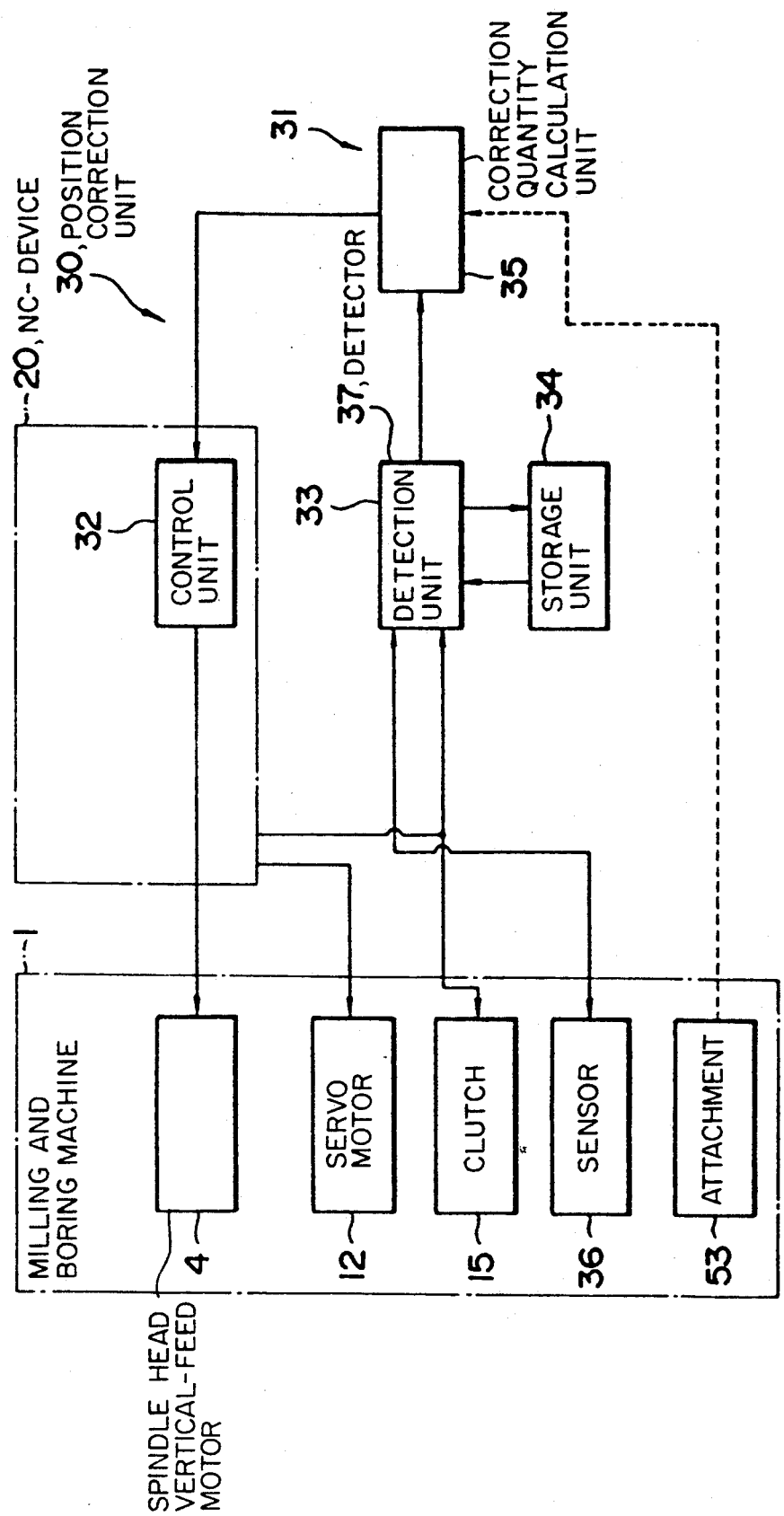
FIG. 7 is a block diagram indicative of the essential portion of the further embodiment.

While in the above embodiment the quantity of movement of the ram 6 is calculated from a signal output from the NC device 20 to the servo motor 12, a sensor 36 comprising a photosensor may be provided to sense the position of movement of the ram 6, as shown in FIGS. 6 and 7. In this embodiment, the data on the position of the ram 6 on the $Z_2$-axis directly detected by the sensor 36 is sent to a detector 37 which detects the quantity of movement of the ram 6 as in the previous embodiment. In the above embodiment, the sensor 36 and the detector 37 constitute a detection unit 33. The sensor 36 may includes a potentiometer, encoder or resolver in addition to the photosensor. While in the present embodiment the correction quantity calculating unit 32 is provided separately from the NC device 20, it may be built in the NC device 20.

The control unit 32 may be provided separately from the NC device 20 and furthermore, the position correction unit 30 may also be provided separately from the NC device 20. The layout of these devices may be made appropriately when the invention is carried out.

Figure 8:
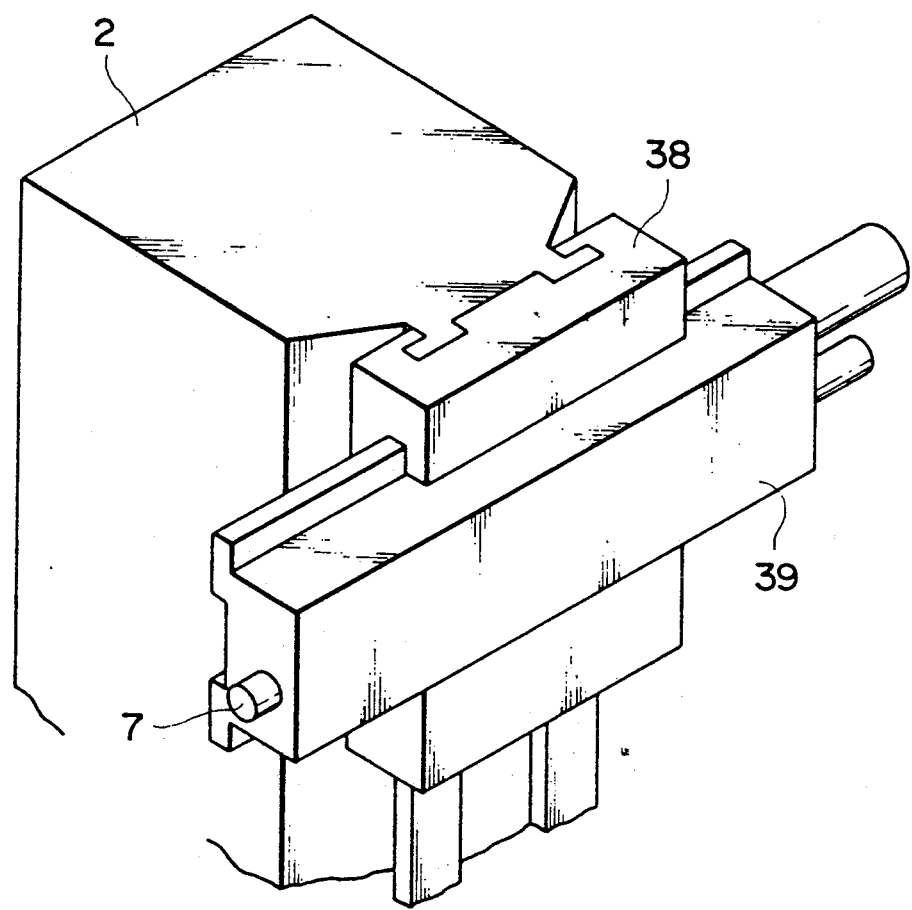
FIG. 8 is a schematic view of a still further embodiment of the present invention.

The present invention is not limited to the on-floor type horizontal milling and boring machine 1 and may be widely applied to machine tools such as machining centers having two horizontally movable shafts like rams, quills, heads or main shafts on the Z-axis. For example, as shown in FIG. 8, the present invention is applicable to machine tools in which the vertically movable member includes a saddle 38 and the horizontally movable member includes a spindle head 39.

As described above, according to the present invention, the vertical position of a horizontally movable member such as a ram is corrected, a large quantity of such correction is provided, cost is reduced and high speed driving of the main shaft is achieved.

What is claimed is:

1. A method for vertically positioning a horizontally movable member disposed on a vertically movable member in a machine tool, the horizontally movable member having a main shaft to which a tool can be attached, comprising the steps of:
   vertically positioning the vertically movable member with vertical moving means;
   horizontally positioning the horizontally movable member with horizontal moving means;
   detecting the horizontal position of the horizontally movable member as positioned by the horizontal moving means;
   determining a vertically corrected position to which the vertical moving means must move the vertically movable member to cause the tool to assume a desired vertical position according to a parameter based on the correlation between the detected horizontal position of the horizontally movable member and a quantity of vertical deviation of the horizontally movable member; and
   controlling the vertical moving means to move the vertically movable member to the vertically corrected position, while keeping a horizontal position of the tool.

2. A method according to claim 1, wherein said detecting step includes detecting whether the horizontally movable member is to be moved depending on the operation of a clutch which is disposed between the horizontally movable member and a servo motor for driving the horizontally movable member.

3. A method according to claim 1, wherein the parameter used in the determining step is such that a correction quantity curve for the horizontally movable member is divided into a plurality of portions having different gradients which are arranged in an ascending order as the quantity of movement of the horizontally movable member increases.

4. A method according to claim 1, wherein said determining step selects one of a parameter used when an attachment is mounted to the horizontally movable member and a parameter used when no attachement is mounted to the horizontally movable member.

5. A method according to claim 4, wherein there are a plurality of parameters, one for each kind of a attachment attached to the horizontally movable member.

6. A method according to claim 3, wherein the determining step determines the vertically corrected position $\Delta Y$, given by $$\Delta Y = (Y_1/Z_1) \times F \times T$$

where F is the speed of movement of the horizontally movable member, T is the time required for calculating the vertically corrected position, $(Y_1/Z_1)$ is the correction gradient of the horizontally movable member for the parameter.

7. A method according to claim 2, wherein the detecting step includes detecting the horizontal position of horizontal movement of the horizontally movable member from the rotational direction and quantity of the servo motor.

8. A machine tool comprising:
   a vertically movable member;
   means for vertically moving the vertically movable member;
   a horizontally movable member disposed on the vertically movable member and including a main shaft to which a tool may be attached;
   means for horizontally moving the horizontally movable member, a vertical position and a horizontal position of the tool being determined by a vertical position of the vertically movable member and a horizontal position of the horizontally movable member, respectively, as positioned by the vertical moving means and the horizontal moving means, respectively;
   means for detecting the horizontal position of the horizontally movable member;
   means for determining a vertically corrected position to which the vertical moving means must move the vertically movable member to cause the tool to assume a desired vertical position on the basis of the detected horizontal position of the horizontally movable member; and
   means for controlling the vertical moving means to move the vertically movable member to the vertically corrected position, while keeping a horizontal position of the tool, as determined by said determining means.

9. An apparatus according to claim 8, wherein a clutch is disposed between the horizontally movable member and a servo motor for driving the horizontally movable member, and said detecting means includes detecting whether the horizontally movable member is moved depending on the operation of the clutch.

10. An apparatus according to claim 9, wherein said detecting means detects the horizontal position of the horizontally movable member from the rotational direction and quantity of the servo motor.

11. An apparatus according to claim 8, wherein said detecting means includes a sensor for sensing the position of the horizontally movable member, and a detector for detecting the horizontal position of the horizontally movable member from the position of the horizontally movable member detected by said sensor.

12. An apparatus according to claim 8, including storage means for storing the horizontal position of the horizontally movable member.

13. An apparatus according to claim 12, wherein said means for storing the horizontal position stores the position of the horizontally movable member directly before its movement and updates the position of the horizontally movable member after its movement with the position of the horizontally movable member directly before its movement.

14. An apparatus according to claim 8, wherein said determining means determines whether an attachment is attached to the horizontally movable member, and has a function of selecting one of a parameter used when an attachment is mounted to the horizontally movable member and a parameter used when no attachment is mounted to the horizontally movable member.

15. An apparatus according to claim 8, wherein the vertically movable member includes a spindle head.

16. An apparatus according to claim 15, wherein said horizontally movable member includes a ram.

17. An apparatus according to claim 15, wherein the horizontally movable member includes a quill.

* * * * *